United States Patent
Lee et al.

(10) Patent No.: US 10,674,487 B2
(45) Date of Patent: Jun. 2, 2020

(54) METHOD FOR TRANSMITTING UPLINK CONTROL CHANNEL IN WIRELESS COMMUNICATION SYSTEM THAT SUPPORTS USE CHANGE OF RADIO RESOURCES, AND APPARATUS THEREFOR

(71) Applicant: LG ELECTRONICS INC., Seoul (KR)

(72) Inventors: Seungmin Lee, Seoul (KR); Hanbyul Seo, Seoul (KR); Inkwon Seo, Seoul (KR); Suckchel Yang, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 82 days.

(21) Appl. No.: 15/122,253

(22) PCT Filed: Mar. 12, 2015

(86) PCT No.: PCT/KR2015/002407
§ 371 (c)(1),
(2) Date: Aug. 29, 2016

(87) PCT Pub. No.: WO2015/137747
PCT Pub. Date: Sep. 17, 2015

(65) Prior Publication Data
US 2016/0374071 A1 Dec. 22, 2016

Related U.S. Application Data

(60) Provisional application No. 61/952,101, filed on Mar. 12, 2014, provisional application No. 61/971,534, filed on Mar. 28, 2014.

(51) Int. Cl.
*H04W 72/04* (2009.01)
*H04L 1/18* (2006.01)
*H04L 5/00* (2006.01)

(52) U.S. Cl.
CPC ....... *H04W 72/0413* (2013.01); *H04L 1/1854* (2013.01); *H04L 1/1861* (2013.01); *H04L 1/1896* (2013.01); *H04L 5/0055* (2013.01)

(58) Field of Classification Search
None
See application file for complete search history.

(56) References Cited

U.S. PATENT DOCUMENTS 9,717,089 B2 * 7/2017 Chae ................ H04L 5/0055
9,723,592 B2 * 8/2017 Kim ................. H04L 1/1861
(Continued)

FOREIGN PATENT DOCUMENTS

CN 101594683 A 12/2009
CN 101816142 A 8/2010
(Continued)

OTHER PUBLICATIONS

MediaTek, "Remaining HARQ detais for TDD eIMTA." 3GPP TSG-RAN WG1 Meeting #76, Prague, CZ rep., Feb. 10-14, 2014.*
(Continued)

*Primary Examiner* — Andrew C Oh
(74) *Attorney, Agent, or Firm* — Birch, Stewart, Kolasch & Birch, LLP

(57) ABSTRACT

The present invention relates to a method and an apparatus for transmitting an uplink control channel of a terminal in a wireless communication system that supports a use change of radio resources. Specifically, the method comprises the steps of: receiving offset information for a second physical uplink control channel (PUCCH) resource region associated with a second type subframe and a third type subframe, the second PUCCH resource region being set on the basis of a first PUCCH resource region for a first type subframe; and transmitting, to a base station, an acknowledgement/negative-ACK (ACK/NACK) for at least one downlink subframe, using the second PUCCH resource region designated according to the offset information.

6 Claims, 10 Drawing Sheets

(56) References Cited

U.S. PATENT DOCUMENTS

| | | | | |
|---|---|---|---|---|
| 9,769,815 B2* | 9/2017 | Seo | | H04W 72/042 |
| 9,860,912 B2* | 1/2018 | Khoryaev | | H04L 5/0055 |
| 9,930,678 B2* | 3/2018 | Kumar | | H04W 72/082 |
| 2011/0176461 A1* | 7/2011 | Astely | | H04B 7/2656 370/280 |
| 2011/0211522 A1 | 9/2011 | Chung et al. | | |
| 2012/0113831 A1* | 5/2012 | Pelletier | | H04L 5/0053 370/252 |
| 2012/0155337 A1* | 6/2012 | Park | | H04L 1/1692 370/280 |
| 2012/0182896 A1 | 7/2012 | Jang et al. | | |
| 2012/0320847 A1* | 12/2012 | Nam | | H04L 1/1861 370/329 |
| 2013/0114575 A1 | 5/2013 | Fu et al. | | |
| 2013/0170463 A1* | 7/2013 | Yang | | H04L 1/1861 370/329 |
| 2013/0182619 A1* | 7/2013 | Tiirola | | H04L 1/1621 370/280 |
| 2013/0194931 A1* | 8/2013 | Lee | | H04L 5/0053 370/241 |
| 2013/0195066 A1* | 8/2013 | Lee | | H04W 52/04 370/329 |
| 2013/0223301 A1* | 8/2013 | Lee | | H04W 72/0413 370/281 |
| 2013/0242817 A1* | 9/2013 | He | | H04L 5/14 370/280 |
| 2013/0242923 A1* | 9/2013 | Yang | | H04L 1/1825 370/329 |
| 2013/0272258 A1* | 10/2013 | Lee | | H04B 7/0413 370/329 |
| 2013/0322352 A1* | 12/2013 | Han | | H04W 72/0413 370/329 |
| 2014/0023004 A1* | 1/2014 | Kumar | | H04W 72/082 370/329 |
| 2014/0050165 A1* | 2/2014 | Park | | H04W 72/0413 370/329 |
| 2014/0105155 A1* | 4/2014 | Kim | | H04L 1/1861 370/329 |
| 2014/0133452 A1* | 5/2014 | Nogami | | H04W 72/0413 370/329 |
| 2014/0169315 A1* | 6/2014 | Han | | H04L 1/1861 370/329 |
| 2014/0204892 A1* | 7/2014 | Oizumi | | H04W 28/14 370/329 |
| 2014/0293909 A1* | 10/2014 | Xu | | H04B 7/2656 370/329 |
| 2014/0301255 A1* | 10/2014 | Yin | | H04L 5/14 370/280 |
| 2014/0301290 A1* | 10/2014 | He | | H04L 65/1016 370/329 |
| 2014/0314031 A1* | 10/2014 | Kim | | H04L 1/1861 370/329 |
| 2014/0328312 A1* | 11/2014 | Seo | | H04L 1/1861 370/329 |
| 2014/0334351 A1* | 11/2014 | Yin | | H04L 5/14 370/280 |
| 2015/0043476 A1* | 2/2015 | Takeda | | H04L 5/0053 370/329 |
| 2015/0055582 A1* | 2/2015 | Park | | H04W 72/042 370/329 |
| 2015/0092757 A1* | 4/2015 | Tiirola | | H04L 1/1861 370/336 |
| 2015/0103703 A1* | 4/2015 | Zeng | | H04W 72/14 370/280 |
| 2015/0117271 A1* | 4/2015 | Liang | | H04L 1/1861 370/280 |
| 2015/0124664 A1* | 5/2015 | Park | | H04L 1/1812 370/280 |
| 2015/0131564 A1* | 5/2015 | Seo | | H04L 5/0055 370/329 |
| 2015/0131565 A1* | 5/2015 | Nakashima | | H04L 5/0055 370/329 |
| 2015/0188690 A1* | 7/2015 | Khoryaev | | H04L 5/0062 370/280 |
| 2015/0208391 A1* | 7/2015 | Park | | H04W 72/0446 370/329 |
| 2015/0223210 A1* | 8/2015 | Guo | | H04W 72/04 370/329 |
| 2015/0244485 A1* | 8/2015 | Nguyen | | H04W 72/0446 370/280 |
| 2015/0264678 A1* | 9/2015 | Yin | | H04W 52/22 370/329 |
| 2015/0289211 A1* | 10/2015 | Lee | | H04W 52/16 370/328 |
| 2015/0304092 A1* | 10/2015 | Hwang | | H04L 1/1864 370/280 |
| 2015/0319636 A1* | 11/2015 | Lee | | H04B 17/345 370/252 |
| 2015/0341866 A1* | 11/2015 | Park | | H04W 52/146 455/522 |
| 2015/0358137 A1* | 12/2015 | Chae | | H04L 1/1854 370/329 |
| 2015/0358138 A1* | 12/2015 | Hwang | | H04L 5/0055 370/280 |
| 2016/0007341 A1* | 1/2016 | Nogami | | H04J 11/00 370/329 |
| 2016/0014728 A1* | 1/2016 | Seo | | H04L 5/0053 370/329 |
| 2016/0020884 A1* | 1/2016 | Chae | | H04L 5/0055 370/329 |
| 2016/0021618 A1* | 1/2016 | Yin | | H04W 52/146 370/280 |
| 2016/0028520 A1* | 1/2016 | Nogami | | H04L 1/0013 370/329 |
| 2016/0057769 A1* | 2/2016 | Chatterjee | | H04W 4/70 370/328 |
| 2016/0198450 A1* | 7/2016 | Wei | | H04L 1/00 370/329 |
| 2016/0269104 A1* | 9/2016 | Lee | | H04B 7/2656 |
| 2016/0286558 A1* | 9/2016 | Chae | | H04L 5/0055 |
| 2016/0344516 A1* | 11/2016 | Lee | | H04L 1/18 |
| 2017/0041894 A1* | 2/2017 | Lee | | H04W 76/14 |
| 2017/0064705 A1* | 3/2017 | Lee | | H04L 1/0026 |
| 2017/0094642 A1* | 3/2017 | Lee | | H04L 1/1887 |
| 2017/0135073 A1* | 5/2017 | Tiirola | | H04L 1/1893 |
| 2017/0214497 A1* | 7/2017 | Lee | | H04L 1/18 |
| 2017/0215203 A1* | 7/2017 | Lee | | H04J 11/00 |
| 2017/0303306 A1* | 10/2017 | Lee | | H04W 72/1278 |

FOREIGN PATENT DOCUMENTS

| | | |
|---|---|---|
| CN | 101867953 A | 10/2010 |
| CN | 101873614 A | 10/2010 |
| JP | 2014-23073 A | 2/2014 |
| KR | 10-1215690 B1 | 12/2012 |
| KR | 10-2013-0049760 A | 5/2013 |
| KR | 10-2013-0078137 A | 7/2013 |

OTHER PUBLICATIONS

Samsung, "On PDSCH HARQ transmission", 3GPP TSG RAN WG1 #74, R1-133095, Barcelona, Spain, Aug. 19-23, 2013, pp. 1-4.

Samsung, "On PUCCH HARQ-ACK procedure for eIMTA", 3GPP TSG RAN WG1 #74bis, R1-134157, Guangzhou, China, Oct. 7-11, 2013, pp. 1-5.

Catt, "PUCCH for TDD eIMTA", 3GPP TSG RAN WG1 Meeting #76, R1-140069, Prague, Czech Republic, Feb. 10-14, 2014, pp. 1-5.

Sharp, "PUCCH resource of HARQ transmission for eIMTA," 3GPP TSG RAN WG1 Meeting #75, R1-135339, San Francisco, USA, Nov. 11-15, 2013, pp. 1-6.

Alcatel-Lucent et al., "UCI transmission for dual connectivity and PUCCH resource allocation," 3GPP TSG RAN WG1 Meeting #76, R1-140164, Prague, Czech Republic, Feb. 10-14, 2014, pp. 1-3.

LG Electronics, "Remaining Details of HARQ Feedback for TDD eIMTA," 3GPP TSG RAN WG1 Meeting #76, R1-140299, XP050735849, Prague, Czech Republic, Feb. 10-14, 2014 (Downloaded by EPO on Feb. 9, 2014), pp. 1-4.

(56) References Cited

OTHER PUBLICATIONS

Mediatek, Inc., "Remaining HARQ Details for TDD eIMTA," 3GPP TSG-RAN WG1 Meeting #76, R1-140235, XP050735788, Prague, Czech Republic, Feb. 10-14, 2014 (Downloaded by EPO on Feb. 9, 2014), pp. 1-4.

NEC, "PUCCH and PHICH Resource Reservation for TDD eIMTA System," 3GPP TSG RAN WG1 Meeting #76, R1-140481, XP050736015, Prague, Czech Republic, Feb. 10-14, 2014 (Downloaded by EPO on Feb. 9, 2014), pp. 1-4.

Nsn et al., "PUCCH Resource Allocation for HARQ-ACK Feedback," 3GPP TSG RAN WG1 Meeting #76, R1-140544, Prague, Czech Republic, Feb. 10-14, 2014, 5 pages.

Samsung, "HARQ-ACK Feedback Procedures for eIMTA," 3GPP TSG RAN WG1 #76, R1-140351, XP050735898, Prague, Czech Republic, Feb. 10-14, 2014 (Downloaded by EPO on Feb. 9, 2014), pp. 1-7.

\* cited by examiner

FIG. 2
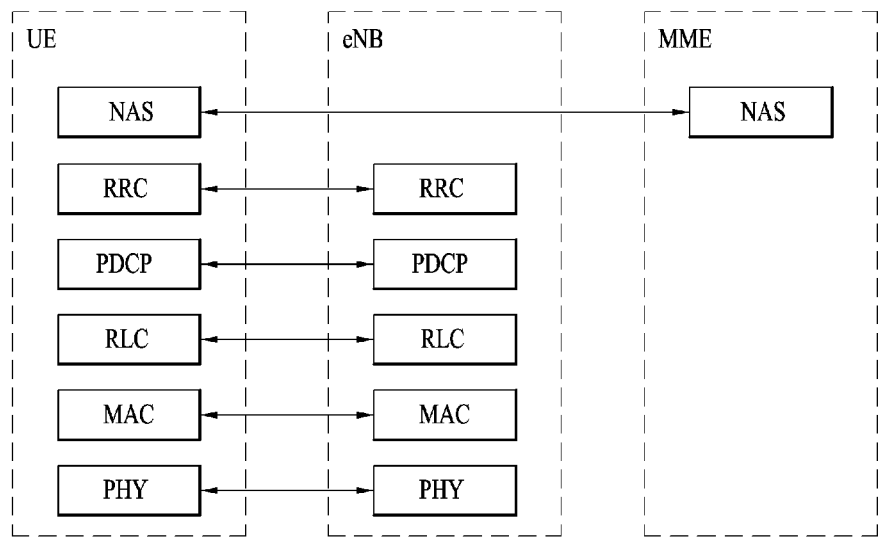
(a) Control-Plane Protocol Stack
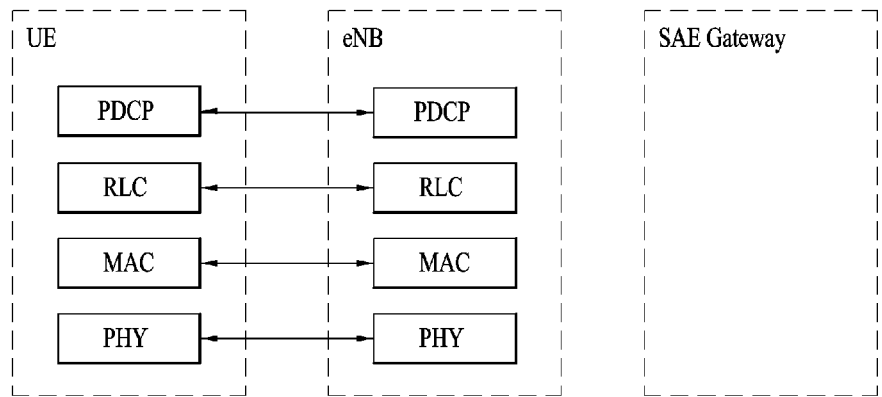
(b) User-Plane Protocol Stack

METHOD FOR TRANSMITTING UPLINK CONTROL CHANNEL IN WIRELESS COMMUNICATION SYSTEM THAT SUPPORTS USE CHANGE OF RADIO RESOURCES, AND APPARATUS THEREFOR

CROSS REFERENCE TO RELATED APPLICATIONS:

This application is the National Phase of PCT International Application No. PCT/KR2015/002407, filed on Mar. 12, 2015, which claims priority under 35 U.S.C. 119(e) to U.S. Provisional Application Nos. 61/952,101, filed on Mar. 12, 2014 and 61/971,534, filed on Mar. 28, 2014, all of which are hereby expressly incorporated by reference into the present application.

TECHNICAL FIELD

The present invention relates to a wireless communication system, and more particularly, to a method for transmitting an uplink control channel in a wireless communication system that supports reconfiguration of radio resources and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The user equipment reports status information of a current channel to the base station periodically and/or non-periodically to assist the base station to efficiently manage the wireless communication system. Since the reported status information may include results calculated considering various statuses, more efficient reporting method will be required.

DISCLOSURE

Technical Problem

An object of the present invention devised to solve the problem lies in a method for transmitting an uplink control channel in a wireless communication system that supports usage change of radio resources and an apparatus therefor.

The objectives and other advantages of the invention may be realized and attained by the structure particularly pointed out in the written description and claims hereof as well as the appended drawings.

Technical Solution

The object of the present invention can be achieved by providing a method for transmitting an uplink control channel of a user equipment (UE) in a wireless communication system supporting reconfiguration of a radio resource, the method including receiving offset information for a second Physical Uplink Control Channel (PUCCH) resource region configured based on a first PUCCH resource region for a first type subframe, the second PUCCH being associated with a second type subframe and a third type subframe, and transmitting, to a base station, Acknowledgement/Negative-ACK (ACK/NACK) for at least one downlink subframe using the second PUCCH resource region, the second PUCCH resource region being designated according to the offset information, wherein the first type subframe has the same HARQ timing for an eIMTA (enhanced interference management and traffic adaptation) UE and a non-eIMTA (non-enhanced interference management and traffic adaptation) UE and has fixed configuration of the radio resource, wherein the second type subframe has different HARQ timing for the eIMTA UE and the non-eIMTA UE and has the fixed configuration of the radio resource, wherein the third type subframe has changeable configuration of the radio resource.

The offset information indicates whether an offset for the second PUCCH resource region is indicated through higher layer signaling or whether the second PUCCH resource region is defined according to a predetermined configuration. Further, the offset information may be presented using a 1-bit indicator.

The offset information may contain an offset defined as an optional information element, wherein the second PUCCH resource region may be indicated through higher layer signaling when the offset is defined, or may be determined according to a predetermined value when the offset is not defined.

The offset information may contain a default value predefined for the second PUCCH resource region, wherein, when an offset for the second PUCCH resource region is not indicated through higher layer signaling, the default value may be defined as the offset for the second PUCCH resource region. Further, the predefined default value may be defined as a total sum of control channel elements for the downlink subframe and a special subframe among first type subframes operatively connected with the first PUCCH resource region.

In another aspect of the present invention, provided herein is a method for transmitting an uplink control channel of a user equipment (UE) in a wireless communication system supporting carrier aggregation and reconfiguration of a radio resource, the method including determining, based on an eIMTA (enhanced interference management and traffic adaptation) configuration for a primary cell and a secondary cell, a Physical Uplink Control Channel (PUCCH) resource allocation scheme for the secondary cell, and transmitting the uplink control channel using a PUCCH resource determined according to the PUCCH resource allocation scheme.

In another aspect of the present invention, provided herein is a user equipment (UE) for transmitting an uplink control channel in a wireless communication system supporting reconfiguration of a radio resource, the UE including a radio frequency unit, and a processor, wherein the processor is configured to receive offset information for a second Physical Uplink Control Channel (PUCCH) resource region configured based on a first PUCCH resource region for a first type subframe, the second PUCCH being associated with a second type subframe and a third type subframe, and transmit, to a base station, Acknowledgement/Negative-ACK (ACK/NACK) for at least one downlink subframe using the second PUCCH resource region, the second PUCCH resource region being designated according to the offset information, wherein the first type subframe has the same HARQ timing for an eIMTA (enhanced interference management and traffic adaptation) UE and a non-eIMTA (non-enhanced interference management and traffic adaptation) UE and has fixed configuration of the radio resource, wherein the second type subframe has different HARQ timing for the eIMTA UE and the non-eIMTA UE and has the fixed configuration of the radio resource, wherein the third type subframe has changeable configuration of the radio resource.

Advantageous Effects

According to an embodiment of the present invention, an uplink control channel may be efficiently transmitted in a wireless communication system supporting usage change of radio resources.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and E-UTRAN based on the 3GPP radio access network standard;

BEST MODE

Figure 1:
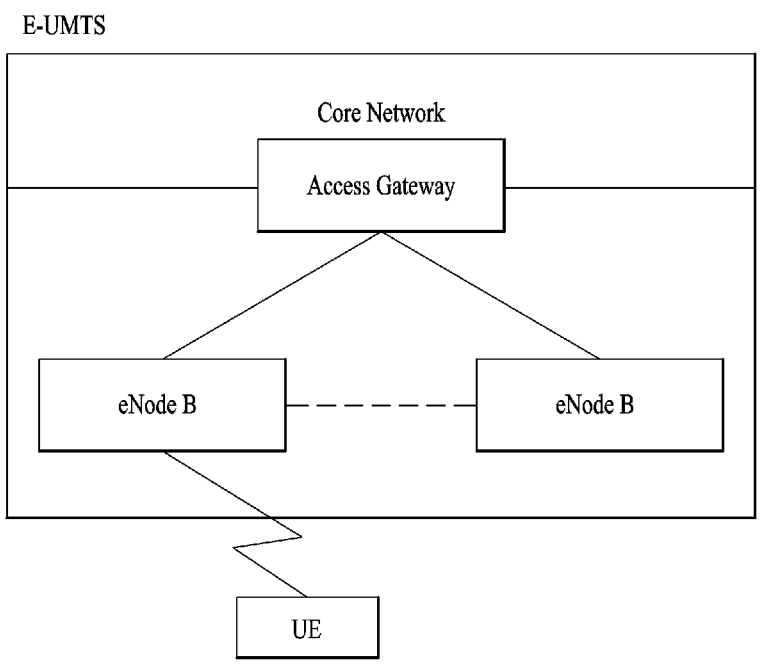
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
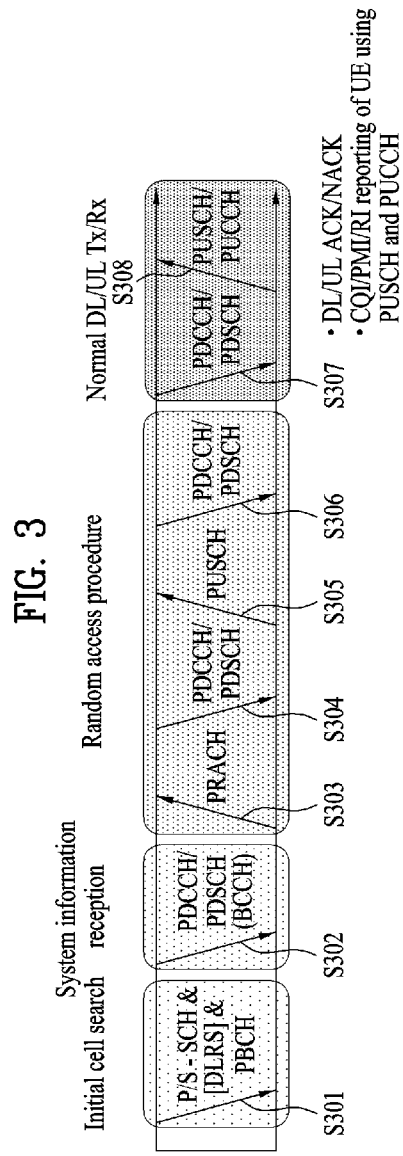
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
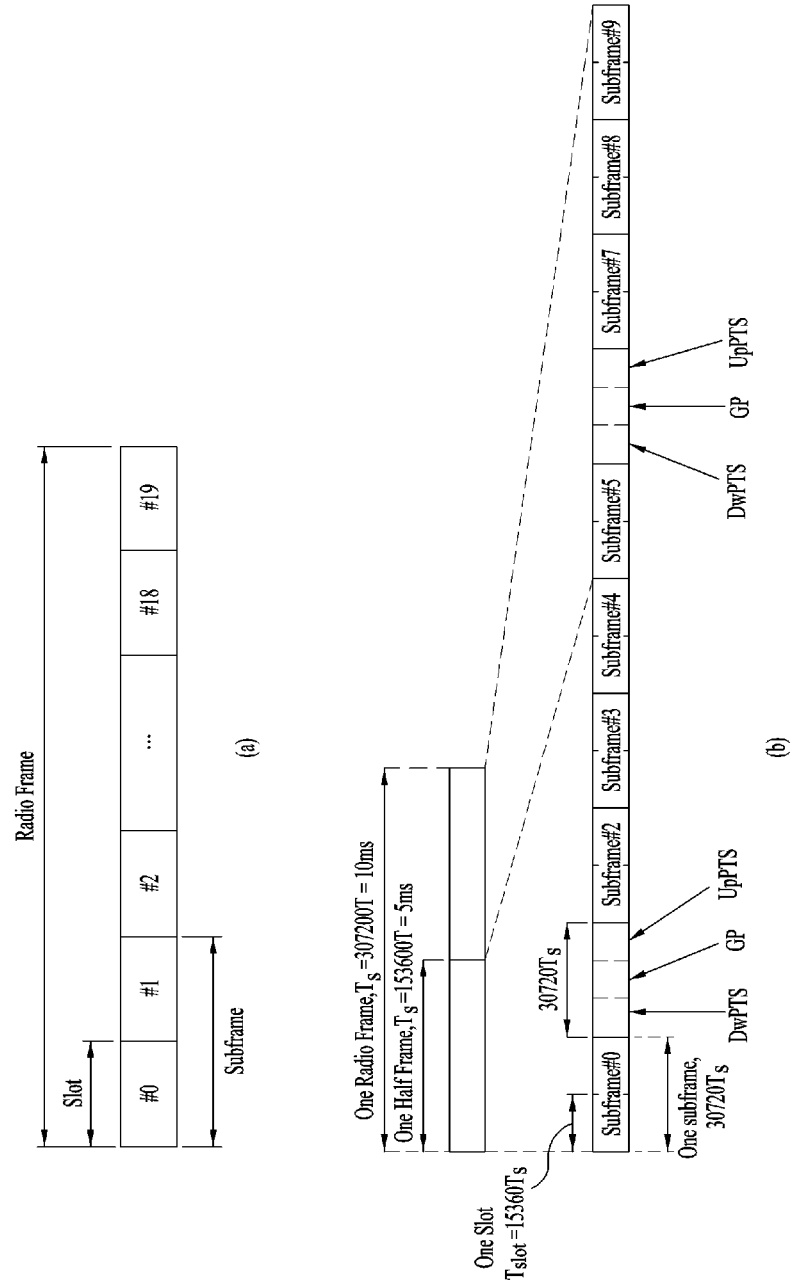
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5123 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 2-continued

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
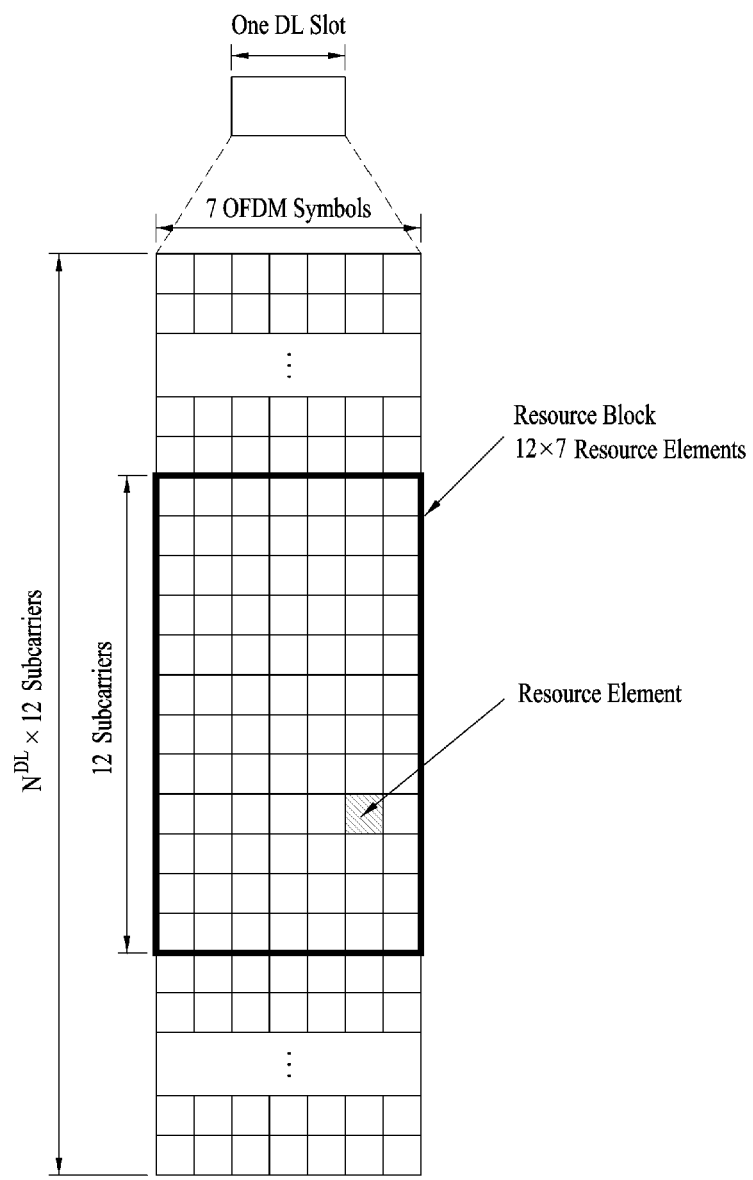
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
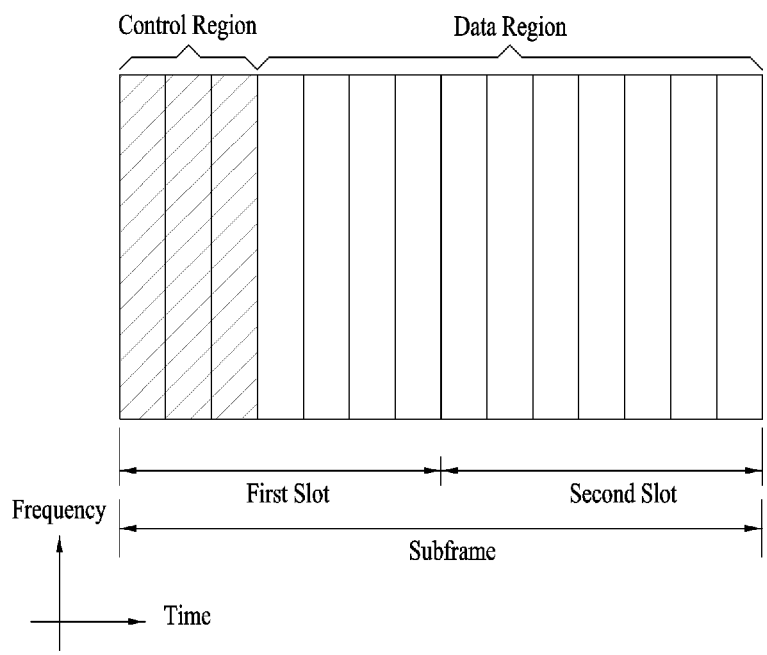
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
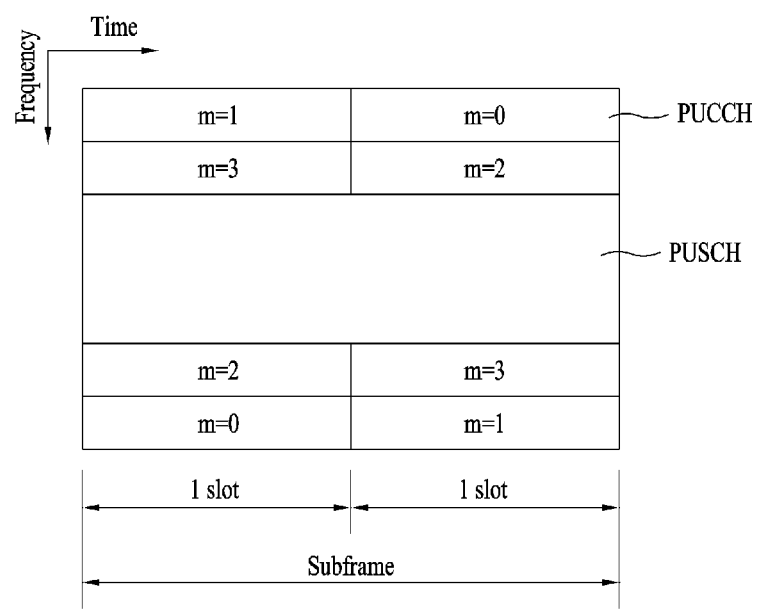
FIG. 7 illustrates the structure of an uplink subframe.

FIG. 7 illustrates the structure of an uplink subframe used in LTE.

Referring to FIG. 7, an uplink (UL) subframe includes a plurality of (e.g., 2) slots. Each slot includes a different number of SC-FDMA symbols according to CP length. The UL subframe is divided into a data region and a control unit in the frequency domain. The data region includes a PUSCH and is used to transmit data signals such as voice. The control region includes a PUCCH and is used to transmit uplink control information (UCI). The PUCCH performs hopping across a slot boundary including an RB pair located at both ends of the data region in the frequency domain.

The PUCCH may be used to transmit control information described below.

Scheduling Request (SR): This is information used to request an uplink UL-SCH resource. This information is transmitted using an On-Off Keying (OOK) scheme.

HARQ ACK/NACK: This is a response signal for a downlink data packet on the PDSCH. This indicates whether a downlink data packet has been successfully received. As a response to a single downlink codeword, 1-bit ACK/NACK is transmitted. As a response to two downlink codewords, 2-bit ACK/NACK is transmitted.

Channel State Information (CSI): This is feedback information about a downlink channel. The CSI includes a channel quality indicator (CQI), and feedback information related to Multiple Input Multiple Output (MIMO) includes a rank indicator (RIA), a precoding matrix indicator (PMI), and a precoding type indicator (PTI). This information uses 20 bits per subframe.

The amount of UCI transmittable by a UE in a subframe depends on the number of SC-FDMAs available for transmission of the UCI. The SC-FDMAs available for transmission of the UCI refers to SC-FDMA symbols other than SC-FDMA symbols for transmission of a reference signal in a subframe. For a subframe in which a sounding reference signal (SRS) is configured, the last SC-FDMA symbol of the subframe is also excluded from the available symbols. The reference signal is used for coherent detection of the PUCCH.

Figure 8:
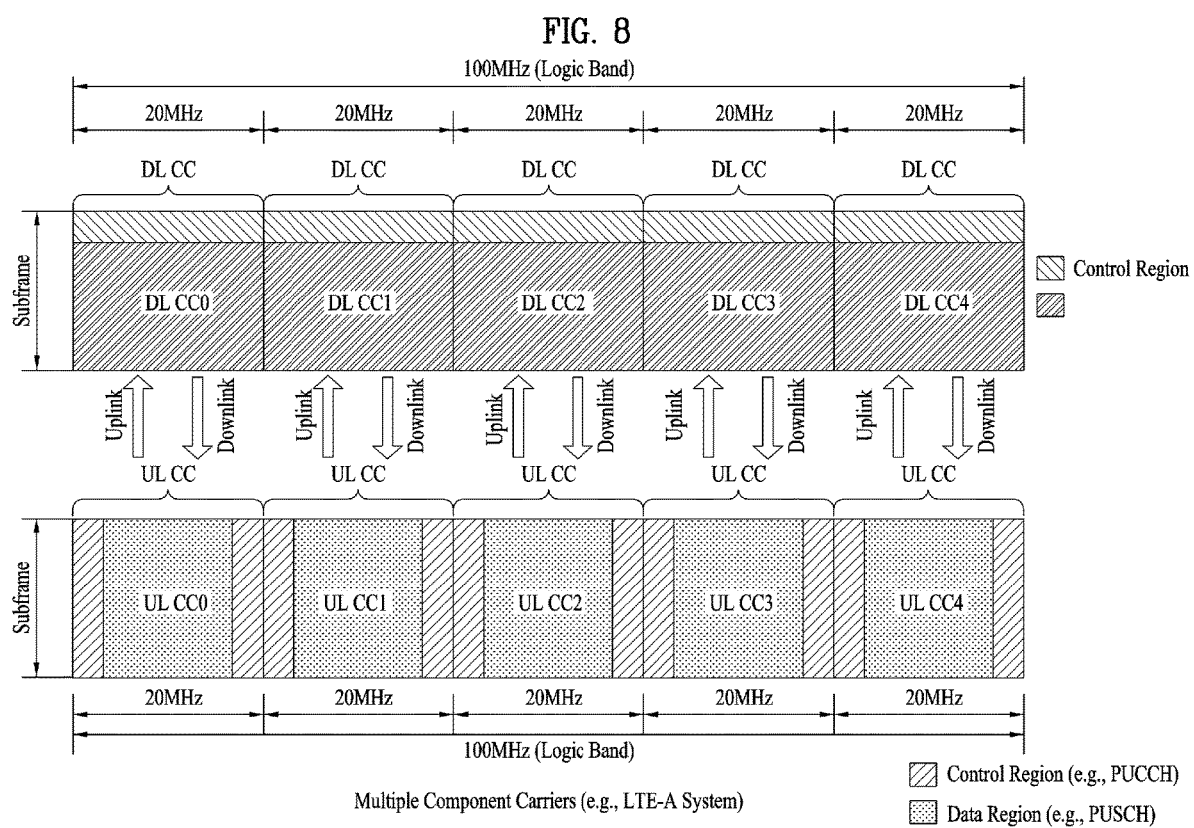
FIG. 8 illustrates a carrier aggregation (CA) communication system.

FIG. 8 illustrates a carrier aggregation (CA) communication system.

Referring to FIG. 8, a plurality of UL/DL component carriers (CCs) may be collected to support a wider UL/DL bandwidth. The term "component carrier (CC)" may be replaced with another equivalent term (e.g., carrier, cell, etc.). CCs may or may not be adjacent to each other in the frequency domain. The bandwidth of each CC may be independently determined. Asymmetric carrier aggregation in which the number of UL CCs differs from that of DL CCs is also possible. Meanwhile, control information may be configured to be transmitted and received through a specific CC. This specific CC may be referred to as a primary CC (or an anchor CC), and the other CCs may be referred to as secondary CCs.

When cross-carrier scheduling (or cross-CC scheduling) is applied, a PDCCH for DL assignment may be transmitted on DL CC#0, and a corresponding PDSCH may be transmitted on DL CC#2. To ensure cross-CC scheduling, a carrier indicator field (CIF) may be introduced. In the PDCCH, presence of CIF may be semi-statically and UE-specifically (or UE group-specifically) indicated through higher layer signaling (e.g., RRC signaling). A baseline for PDCCH transmission is summarized below.

CIF Disabled: A PDCCH on a DL CC is assigned a PDSCH resource on the same DL CC or a PUSCH resource on one linked UL CC.

No CIF

Identical to LTE PDCCH structure (the same coding, same CCE-based resource mapping) and DCI format CIF Enabled: A PDCCH on a DL CC can be assigned a PDSCH or PUSCH resource on a specific DL/UL CC among a plurality of aggregated DL/UL CCs, using a CIF An extended LTE DCI format having a CIF The CIF (when configured) is a fixed x-bit field (e.g., x=3)

The location of the CIF (when configured) is fixed irrespective of the size of the DCI format.

Reusing the LTE PDCCH structure (the same coding and same CCE-based resource mapping)

When a CIF is present, a base station may assign a PDCCH monitoring DL CC set to lower BD complexity on the UE. The PDCCH monitoring DL CC set includes at least one DL CC which is a part of all aggregated DL CCs, and the UE detects/decodes a PDCCH only on the at least one DL CC. That is, if the base station schedules a PDSCH/PUSCH for the UE, the PDCCH is transmitted through only the PDCCH monitoring DL CC set. The PDCCH monitoring DL CC set may be configured in a UE-specific, UE-group-specific or cell-specific manner. The term "PDCCH monitoring DL CC" may be replaced with another equivalent term such as "monitoring carrier" and "monitoring cell". In addition, a CC aggregated for the UE may be expressed as an equivalent term such as "serving CC," "serving carrier," and "serving cell".

Figure 9:
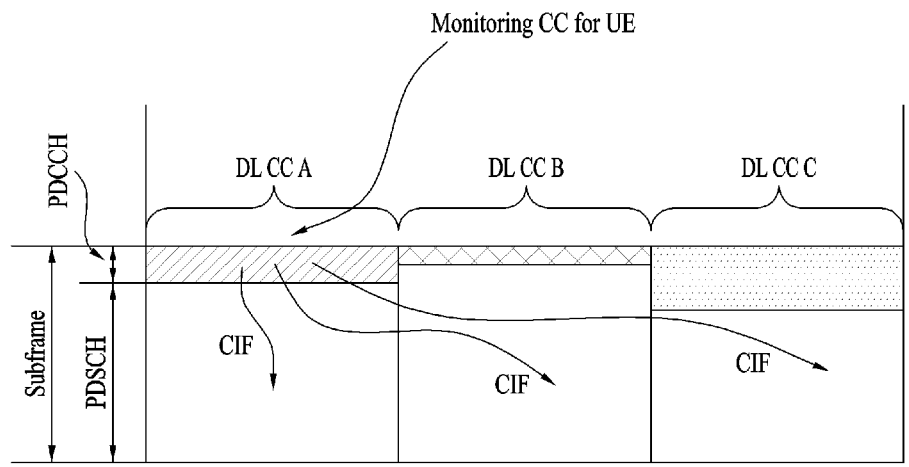
FIG. 9 illustrates scheduling performed when a plurality of carriers is aggregated.

FIG. 9 illustrates a scheduling operation in the case where a plurality of carriers is aggregated. It is assumed that 3 DL CCs have been aggregated. It is also assumed that DL CC A is configured as a PDCCH monitoring DL CC. DL CCs A to C may be referred to as serving CCs, serving carriers, serving cells, or the like. If the CIF is disabled, each DL CC may transmit only a PDCCH for scheduling the PDSCH thereof without a CIF according to the LTE PDCCH configuration. On the other hand, if the CIF is enabled by UE-specific (or UE-group-specific or cell-specific) higher layer signaling, not only a PDCCH for scheduling the PDSCH of DL CC A but also a PDCCH for scheduling the PDSCH of another CC may be transmitted on DL CC A (a monitoring DL CC) using the CIF. In this case, a PDCCH is not transmitted on DL CC B/C, which is not configured as a PDCCH monitoring DL CC. Accordingly, DL CC A (a monitoring DL CC) must include a PDCCH search space related to DL CC A, a PDCCH search space related to DL CC B and a PDCCH search space related to DL CC C. In this specification, it is assumed that a PDCCH search space is defined for each carrier.

As described above, LTE-A considers using the CIF in a PDCCH to perform cross-CC scheduling. Whether the CIF is used (namely, a cross-CC scheduling mode or non-cross-CC scheduling mode is supported) and switching between the modes may be semi-statically/UE-specifically configured through RRC signaling. After being subjected to the RRC signaling process, the UE may recognize whether the CIF is used in a PDCCH that is to be scheduled therefor.

Figure 10:
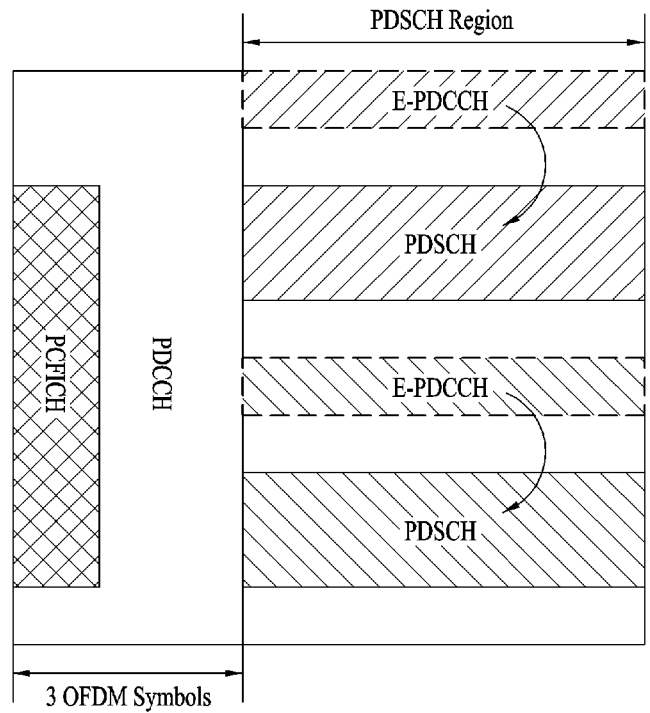
FIG. 10 illustrates an EPDCCH and a PDSCH scheduled by the EPDCCH.

FIG. 10 illustrates an EPDCCH and a PDSCH scheduled by the EPDCCH.

Referring to FIG. 10, for the EPDCCH, a part of the PDSCH region for transmitting data may be generally defined and used. A UE must perform blind decoding to detect presence of an EPDCCH thereof. The EPDCCH performs the same scheduling operation (i.e., controlling a PDSCH and a PUSCH) as performed by the legacy PDCCH, but may increase complexity when the number of UEs accessing a node such as the RRH since the number of EPDCCHs assigned in the PDSCH region increases and thus the number of times of blind decoding which a UE needs to perform increases.

Figure 11:
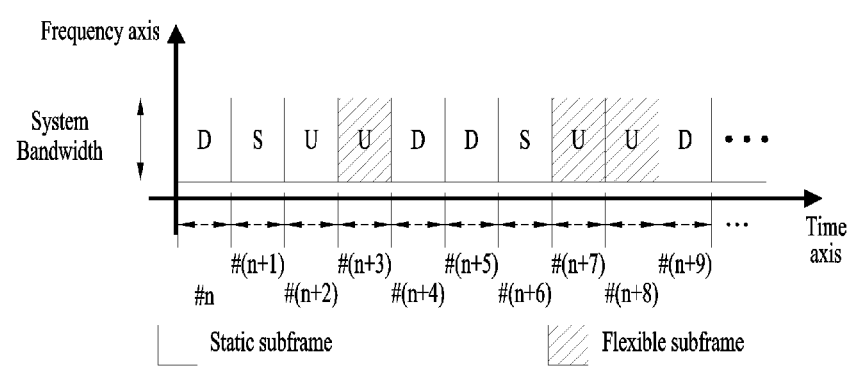
FIG. 11 illustrates division of (legacy) subframes into a static subframe set and a flexible subframe set in a TDD system environment.

FIG. 11 illustrates division of (legacy) subframes into a static subframe set and a flexible subframe set in a TDD system environment. In the example of FIG. 8, a legacy UL-DL configuration established through a system information block (SIB) signal is assumed to be UL-DL configuration #1 (i.e., DSUUDDSUUD), and an eNB is assumed to announce reconfiguration information about radio resources to a UE through a predefined signal.

The radio resource reconfiguration message is used to signal usages of radio resources appearing i) at and after the time at which the reconfiguration message is received, ii) after the time at which the reconfiguration message is received, or iii) when a predefined time (i.e., a subframe offset) passes after the time at which the reconfiguration message is received, according to a predefined rule.

Based on the description above, this embodiment proposes a method to solve the problem of implicit PUCCH resource collision occurring in relation to DL HARQ-ACK between an eIMTA (enhanced interference management and traffic adaptation) UE (e.g., a Rel-12 UE) and a legacy UE (e.g., a Rel-11 UE or a non-eIMTA UE) when configuration of a radio resource in a specific cell (i.e., an eIMTA cell) dynamically changes according to the state of load.

In this embodiment, the reconfiguration message may be transmitted in the form of a higher layer signal (e.g., SIB/PBCH/MAC/RRC) or physical layer signal (e.g., PDCCH/EPDCCH/PDSCH) in a predefined cell (e.g. Primary Cell (PCell)). The reconfiguration message may be UE-specific, cell-specific, UE-group-specific, or UE-group-common. Additionally, the reconfiguration message may be transmitted in a predefined cell (e.g., PCell) through a UE-specific search space (USS) or a common search space (CSS).

Hereinafter, for simplicity, the present invention will be described based on the 3GPP LTE system. However, the proposed method is also applicable to systems other than the 3GPP LTE system. Embodiment of the present invention are also applicable to i) a case where TDD cells are subjected to CA, and at least one (namely, some or all) of the aggregated cells operates in a radio resource reconfiguration mode and/or ii) a case where a combination of TDD cell(s) and FDD cell(s) (e.g., a combination of a TDD PCell and an FDD SCell or a combination of an FDD PCell and a TDD SCell) is subjected to CA and at least one (namely, some or all) of the aggregated TDD cell(s) operates in the radio resource reconfiguration mode.

PUCCH resource allocation may be performed in the form of Table 3 from the perspective of an eIMTA UE. In other words, to address the problem of DL HARQ-ACK-related implicit PUCCH resource collision occurring between the eIMTA UE and a legacy UE (or non-eIMTA UE), PUCCH resource allocation may be defined as shown in Table 3.

TABLE 3

Subframe indexing principles
    Subframes are indexed according to the principle
        First Type: Fixed subframes having the same HARQ timing for both eIMTA and
        non-eIMTA UEs
        Second Type: Fixed subframes having different HARQ timing for eIMTA and
        non-eIMTA UEs
        Third Type: Flexible subframes
    e.g.,) No further separation between the second and the third group of subframes, i.e.
    block interleaving is applied for second and third group of subframes together
Resource allocation formulas for PDCCH
    For the first type of subframes the exact equation is the same as in TS 36.213 [1] but
    M refers to the Table 3-A
        PUCCH resource for antenna port $p_0$ is given by:
            $n_{PUCCH}^{(1, p0)} = (M - m - 1) \cdot N_c + m \cdot N_{c+1} + n_{CCE} + N_{PUCCH}^{(1)}$
        PUCCH resource for antenna port $p_1$ is given by:
            $n_{PUCCH}^{(1, p1)} = (M - m - 1) \cdot N_c + m \cdot N_{c+1} + n_{CCE} + 1 + N_{PUCCH}^{(1)}$
    For $2^{nd}$ and $3^{rd}$ type of subframes, PUCCH resource for antenna port $p_0$ is given by:
        $n_{PUCCH1}^{(1, p0)} = (M_1 - m - 1) \cdot N_c + m \cdot N_{c+1} + n_{CCE} + N_{PUCCH}^{(1)} + N_{Offset}$
    For $2^{nd}$ and $3^{rd}$ type of subframes, PUCCH resource for antenna port $p_1$ is given by:
        $n_{PUCCH1}^{(1, p1)} = (M_1 - m - 1) \cdot N_c + m \cdot N_{c+1} + n_{CCE} + 1 + N_{PUCCH}^{(1)} + N_{Offset}$
    In the above equations, $p_0$ and $p_1$ are antenna port, $N_{PUCCH}^{(1)}$ is value obtained by high
    layer signaling, $N_c = \max\{0, \lfloor [N_{RB}^{DL} \cdot (N_{sc}^{RB} \cdot c - 4)]/36 \rfloor\}$, and
    $n_{CCE}$ is at lowest ECCE index of ECCE among a plurality of ECCEs for EPDCCH
    transmission.
    $M_1$ refers to the Table 3-B
    FFS whether $N_{Offset}$ is RRC configured or based on an equation
Subframe indexing tables
    Table 3-A: Subframe indexing for subframes for which eIMTA and non-eIMTA UEs
    have the same timing (i.e., Downlink association set index K: $\{k_0, k_1, \ldots K_{M-1}\}$ for the
    first type of subframes)
        e.g.,) M is the number of elements in the set K defined in Table 3-A, and the UE
        shall transmit DL-HARQ ACK(s) (on PDSCH(s) indicated by the detection of
        corresponding PDCCH(s)/EPDCCH(s) in subframe(s) (n − k)) in subframe n

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | Invalid | | | | | | |
| | 4 | | | | Invalid | | | | | | |
| | 5 | | | | Invalid | | | | | | |
| | 6 | — | — | 7 | — | — | — | — | 7 | — | — |
| 4 | 0 | — | — | — (or (6)) | — | — | — | — | — | — | — |
| | 1 | — | — | 7, (6) | 4 | — | — | — | — | — | — |
| | 2 | | | | Invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | Invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |

TABLE 3-continued

| | 5 | — | — | 13, 12, 9, 8, 7, 5, 4, 11, 6 | — | — | — | — | — | — | — |
| | 6 | — | — | 7 | — | — | — | — | — | — | — |

Table 3-B: Subframe indexing for subframes for which eIMTA and non-eIMTA UEs have the different timing (i.e., Downlink association set index K: $\{k_0, k_1, \ldots K_{M_1-1}\}$ for the second and third type of subframes)
e.g.,) $M_1$ is the number of elements in the set K defined in Table 3-B, and the UE shall transmit DL-HARQ ACK(s) (on PDSCH(s) indicated by the detection of corresponding PDCCH(s)/EPDCCH(s) in subframe(s) (n − k)) in subframe n

| DL HARQ reference configuration | UL-DL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | Invalid | | | | | | |
| | 4 | | | | Invalid | | | | | | |
| | 5 | | | | Invalid | | | | | | |
| | 6 | — | — | 6, 8, 4 | — | — | — | — | 8, 6, 4 | — | — |
| 4 | 0 | — | — | 12, 7, 11, 8 | 7, 4, 5, 6 | — | — | — | — | — | — |
| | 1 | — | — | 12, 8, 11 | 7, 5, 6 | — | — | — | — | — | — |
| | 2 | | | | Invalid | | | | | | |
| | 3 | — | — | 12, 8 | 4, 7 | — | — | — | — | — | — |
| | 4 | — | — | — | — | — | — | — | — | — | — |
| | 5 | | | | Invalid | | | | | | |
| | 6 | — | — | 12, 11, 8 | 4, 5, 6 (or 4, 6, 5) | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4, 9, 5 | — | — | — | — | — | — | — |

HARQ-ACK resource allocation with EPDCCH
    For EPDCCH, same subframe indexing is used as for PDCCH
    RRC configured offset is not introduced for EPDCCH
Ordering of the HARQ-ACK bits
    For PUCCH format 3, the currently specified principle is used
    FFS: For PUCCH format 1b with channel selection FIG. 12 is a reference diagram illustrating subframe indexing according to Table 3.

Figure 12:
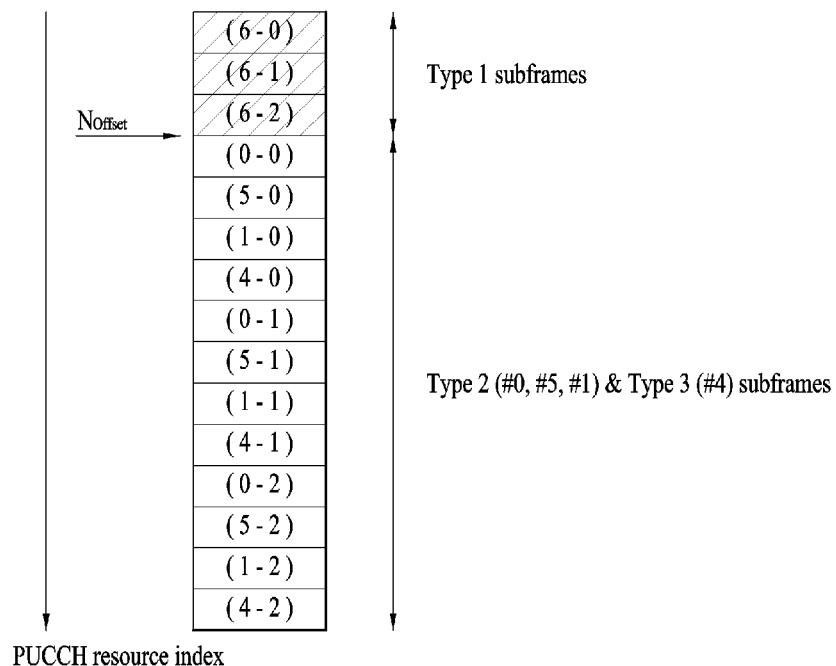
FIG. 12 is a reference diagram illustrating resource allocation of PDCCH.

Referring to FIG. 12, for SIB-1 UL-DL config #0, DL HARQ ref config #4, and UL subframe #2, transmission of ACK of DL subframe #6 is defined in UL subframe #2 for Type 1 subframe, transmission of ACK of DL subframes #0, #5 and #1 is defined in UL subframe #2 for Type 2 subframe, and transmission of ACK of DL subframe #4 is defined in UL subframe #2 for Type 3 subframe. In addition, in notation of (x-y) in FIG. 12, x denotes the index of a DL subframe for which ACK is transmitted in UL subframe #2, and y denotes the OFDM symbol index (in the PDCCH region) in DL subframe x.

To designate the implicit PUCCH resource region of Type 2 and/or Type 3 subframes such that the regions do not overlap the implicit PUCCH resource region related to Type 1 subframes (i.e., "Fixed subframes having the same HARQ timing for both eIMTA and non-eIMTA UEs"), a region position corresponding to the sum of a Type 1 subframe-related implicit PUCCH resource region and $N_{offset}$ may be defined as the start point of the implicit PUCCH resource region of the Type 2 and/or Type 3 SFs. Herein, $N_{offset}$ may be defined using two major methods.

The first method is for an eNB to announce the value of Noffset to the eIMTA UE through a predefined signal (e.g., RRC signaling). As an example of this method, the eNB may flexibly manage the remaining PUCCH resources on an RRC signaling time scale. However, the value of $N_{offset}$ is commonly used in UL SFs of different positions operatively connected with different numbers of Type 1 DL/Special SFs for at least the RRC signaling time scale. Thereby, the value of $N_{offset}$ may not be minimized on behalf of a UL SF operatively connected with a relatively small number of Type 1 DL/Special SFs (namely, PUCCH resources may be received and excessive PUCCH Resource fragmentation may occur).

According to the first method, an optimized value of $N_{offset}$ cannot be set in a specific UL SF on at least RRC signaling time scale (namely, the effect of PUCCH resource saving cannot be achieved due to PUCCH resource block interleaving) even if the total number of CCEs in Type 1 DL/Special SFs operatively connected with the specific UL SF may vary over time (namely, the value of PCFICH may dynamically change for respective DL/Special SFs). For simplicity, the first method will be referred to as "[OPTION #1]" in the following description.

The second method is to implicitly define the value of $N_{offset}$ according to a predefined equation/configuration/rule (without additional signaling). For example, $N_{offset}$ may be defined as $$N_{offset} = \sum_{m=0}^{M-1} N_{CCE,m}$$

(namely, the total number of CCEs of Type 1 DL/Special SFs operatively connected with a specific UL SF). Herein, $N_{CCE,m}$ denotes the total number of CCEs in a DL/Special SF in which the (m+1)-th PUCCH resource packing operation is performed among M SFs operatively connected with the specific UL SF (see Table 3-A of Table 3).

Compared to the first method, the second method causes the value of Noffset to be set in consideration of variation of the total number of CCEs in Type 1 DL/Special SFs operatively connected with the specific UL SF over time. On the other hand, the eNB is less likely to flexibly manage the (remaining) PUCCH resources. For simplicity, the second method will be referred to as "[OPTION #2]" in the following description.

In the embodiments of the present invention described below, methods for efficiently designating an implicit PUCCH resource region of Type 2 SFs (i.e., "fixed subframes having different HARQ timing for eIMTA and non-eIMTA UEs") and/or Type 3 SFs (i.e., "flexible subframes") are proposed. For simplicity, the present invention will be described focusing on the aforementioned methods (i.e., [OPTION #1] and [OPTION #2]). However, it should be noted that the present invention is applicable to a method for setting $N_{offset}$ other than the aforementioned methods.

1. Method 1

In Method 1, the eNB may announce, to the eIMTA UE, the method for setting $N_{offset}$ (i.e., configurability) to be used through a predefined signal (e.g., a physical layer signal or higher layer signal).

For example, the eNB may announce, to the eIMTA UE, which of the two predefined methods for setting $N_{offset}$ (i.e., [OPTION#1] and [OPTION#2]) is to be used, through RRC signaling (e.g., 1 bit). In addition, if the eIMTA UE fails to receive the RRC signaling (namely, a signal indicating which of the methods for setting $N_{offset}$ has been selected) from the eNB, or if there is no such RRC parameter (or RRC signaling), the eIMTA UE may assume that a predefined default method (e.g., [OPTION#1] or [OPTION#2]) is employed.

This operation may be determined as meaning that the corresponding RRC signaling is defined as an Optional Information Element (IE) (or Optional Parameter) (namely, the corresponding parameter may or may not exist) or that the default value of the corresponding RRC signaling is set to a value indicating a specific method for setting $N_{offset}$(e.g., [OPTION#1] or [OPTION#2]).

2. Method 2

In method 2, as the method [OPTION#1] for setting the value of $N_{offset}$ through RRC signaling, the eNB announces the value of $N_{offset}$ to the eIMTA UE. The RRC signaling may be defined as an Optional Information Element (IE) (or Optional Parameter) (namely, the corresponding parameter may or may not exist). Herein, if i) the eIMTA UE fails to receive such RRC signaling or RRC parameter from the eNB, or ii) the RRC parameter or RRC signaling does not exist, the eIMTA UE may determine that the value of $N_{offset}$ calculated according to a predefined default method (e.g., [OPTION#2]) is used.

As another example, a value calculated using a specific method for setting $N_{offset}$ (e.g., [OPTION#2]) may be predefined as a default value of the RRC signaling or RRC parameter. If i) the eIMTA UE fails to receive such RRC signaling or RRC parameter from the eNB, or ii) the RRC parameter or RRC signaling does not exist, the default value may be set to be used.

Further, Method 2 may be determined as having a feature (i.e., configurability) of (the eNB) selecting one of the predefined methods for setting $N_{offset}$ (namely, [OPTION #1] and [OPTION #2]).

3. Method 3

In Method 3, as a method (i.e., OPTION #1) for setting the value of $N_{offset}$ through RRC signaling, the eNB basically announces the value of $N_{offset}$ to the eIMTA UE. If i) the eIMTA UE fails to receive such RRC signaling or RRC parameter from the eNB, or ii) the RRC parameter or RRC signaling does not exist, the eIMTA UE may determine that the value of $N_{offset}$ calculated according to a predefined default method (e.g., [OPTION#2]) is used.

For example, it may be determined that a value calculated according to a specific method for setting $N_{offset}$ (e.g., OPTION #2) is predefined as the default value of the RRC signaling or RRC parameter. Accordingly, if i) the eIMTA UE fails to receive such RRC signaling or RRC parameter from the eNB, or ii) the RRC parameter or RRC signaling does not exist, the eIMTA UE may determine that the default value is used.

Further, Method 3 may be determined as having a feature (i.e., configurability) of (the eNB) selecting one of the predefined methods for setting $N_{offset}$ (namely, [OPTION #1] and [OPTION #2]).

4. Method 4

According to Method 4, when at least one cell (or all cells) operates in a radio resource dynamic reconfiguration mode (i.e., eIMTA-enabled Cell) in a situation where CA is applied, "Ordering of HARQ-ACK bits (for PUCCH format 1b with channel selection)" (Table 3) and "PUCCH resource allocation" related to a specific cell may be configured to conform to at least one (namely, some or all of) Rule #1-1 to Rule #2-3 described below.

For simplicity, it is assumed in the following description that two cells (or component carriers) are subjected to CA. However, it is apparent to those skilled in the art that the present invention is also applicable to a situation where three or more cells (or component carriers) are subjected to CA. For simplicity, the two cells will be referred to as a primary cell (PCell) and a secondary cell (SCell), respectively, in the following description. The rules described below may be configured to be applied only when i) the bundling window size of PCell or SCell related to the PUCCH format 1b with channel selection is 4 and/or ii) CA is applied.

Hereinafter, Rule #1-1 to Rule #1-3 will be described for the case of self-scheduling 4-1. Rule #1-1: eIMTA-Enabled PCell and Non eIMTA-Enabled SCell For an eIMTA-enabled PCell (Example #1-1-A), regarding PUCCH resource allocation, it may be defined that HARQ-ACK is transmitted according to the DL HARQ reference configuration of a finally determined PCell, and implicit PUCCH resource stacking, block interleaving and $N_{offset}$ signaling are performed according to Table 3.

For the eIMTA-enabled PCell, regarding ordering of HARQ-ACK bits, it may be defined that ordering of HARQ-ACK bits is performed according to order of subframe indexes related to implicit PUCCH resource stacking (namely, Table 3-A and Table 3-B) matched with DL HARQ reference configuration of the PCell described in Table 3.

Next, for a non-eIMTA-enabled SCell (Example #1-1-B), regarding PUCCH resource allocation, it may be defined that HARQ-ACK is transmitted according to the finally determined DL HARQ reference configuration of the SCell and a pre-RRC signaled resource is used as the PUCCH resource (e.g., an ARI (ACK/NACK resource indicator) field is used).

Further, for the non-eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

In addition, for the non-eIMTA-enabled SCell (Example #1-1-C), regarding PUCCH resource allocation, it may be defined that HARQ-ACK is transmitted according to the finally determined DL HARQ reference configuration of the SCell and a pre-RRC signaled resource is used as the PUCCH resource (e.g., the ARI field is used).

Further, for the non-eIMTA-enabled SCell, ordering of HARQ-ACK bits may be defined to be performed according to order of legacy (e.g., Rel-11) subframe indexes matched with the DL HARQ reference configuration of the finally determined SCell.

4-2. Rule #1-2: eIMTA-Enabled PCell and eIMTA-Enabled SCell

For an eIMTA-enabled PCell (Example #1-2-D), regarding PUCCH resource allocation, it may be defined that HARQ-ACK is transmitted according to the DL HARQ reference configuration of a finally determined PCell, and implicit PUCCH resource stacking, block interleaving and $N_{offset}$ signaling are performed according to Table 3.

For the eIMTA-enabled PCell, regarding ordering of HARQ-ACK bits, it may be defined that ordering of HARQ-ACK bits is performed according to order of subframe indexes related to implicit PUCCH resource stacking (namely, Table 3-A and Table 3-B) matched with DL HARQ reference configuration of the PCell described in Table 3.

In addition, for an eIMTA-enabled SCell (Example #1-2-E), regarding PUCCH resource allocation, it may be defined that HARQ-ACK is transmitted according to the finally determined DL HARQ reference configuration of the SCell and a pre-RRC signaled resource is used as the PUCCH resource (e.g., the ARI field is used).

Further, for the eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

In addition, for the eIMTA-enabled SCell (Example #1-2-F), regarding PUCCH resource allocation, it may be defined that HARQ-ACK is transmitted according to the finally determined DL HARQ reference configuration of the SCell and a pre-RRC signaled resource is used as the PUCCH resource (e.g., the ARI field is used).

Further, for the eIMTA-enabled SCell, ordering of HARQ-ACK bits may be defined to be performed according to order of legacy (e.g., Rel-11) subframe indexes matched with the DL HARQ reference configuration of the finally determined SCell.

4-3. Rule #1-3: Non-eIMTA-Enabled PCell and eIMTA-Enabled SCell

For a non-eIMTA-enabled PCell (Example #1-3-G), regarding PUCCH resource allocation, it may be defined that HARQ-ACK is transmitted according to the DL HARQ reference configuration of a finally determined PCell, and all parameters and operations related to implicit PUCCH resource stacking conform to legacy (e.g., Rel-11) operations. That is, implicit PUCCH resource stacking, block interleaving and $N_{offset}$ signaling described in Table 3 may be defined not to be used.

Further, for the non-eIMTA-enabled PCell, ordering of HARQ-ACK bits may be defined to be performed according to order of legacy (e.g., Rel-11) subframe indexes matched with the DL HARQ reference configuration of the finally determined PCell.

Next, for an eIMTA-enabled SCell (Example #1-3-H), regarding PUCCH resource allocation, it may be defined that HARQ-ACK is transmitted according to the finally determined DL HARQ reference configuration of the SCell and a pre-RRC signaled resource is used as the PUCCH resource (e.g., an ARI field is used).

Further, for the eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

In addition, for the eIMTA-enabled SCell (Example #1-3-I), regarding PUCCH resource allocation, it may be defined that HARQ-ACK is transmitted according to the finally determined DL HARQ reference configuration of the SCell and a pre-RRC signaled resource is used as the PUCCH resource (e.g., the ARI field is used).

Further, for the eIMTA-enabled SCell, ordering of HARQ-ACK bits may be defined to be performed according to order of legacy (e.g., Rel-11) subframe indexes matched with the DL HARQ reference configuration of the finally determined SCell.

Hereinafter, Rule #2-1 to Rule #2-3 will be described focusing on cross carrier scheduling.

4-4. Rule #2-1: eIMTA-Enabled PCell and Non-eIMTA-Enabled SCell

For an eIMTA-enabled PCell (Example #2-1-J), regarding PUCCH resource allocation, it may be defined that HARQ-ACK is transmitted according to the DL HARQ reference configuration of a finally determined PCell, and implicit PUCCH resource stacking, block interleaving and $N_{offset}$ signaling are performed according to Table 3.

For the eIMTA-enabled PCell, regarding ordering of HARQ-ACK bits, it may be defined that ordering of HARQ-ACK bits is performed according to order of subframe indexes related to implicit PUCCH resource stacking (namely, Table 3-A and Table 3-B) matched with DL HARQ reference configuration of the PCell described in Table 3.

In addition, for a non-eIMTA-enabled SCell (Example #2-1-K), regarding PUCCH resource allocation, it may be defined that HARQ-ACK is transmitted according to the finally determined DL HARQ reference configuration of the SCell, and implicit PUCCH resource stacking, block interleaving and $N_{offset}$ signaling which are matched with DL HARQ reference configuration of the SCell are performed according to Table 3.

Further, for the non-eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

In addition, for the non-eIMTA-enabled SCell (Example #2-1-L), regarding PUCCH resource allocation, it may be defined that HARQ-ACK is transmitted according to the finally determined DL HARQ reference configuration of the SCell, and implicit PUCCH resource stacking, block interleaving and $N_{offset}$ signaling which are matched with DL HARQ reference configuration of the SCell are performed according to Table 3.

Further, for the non-eIMTA-enabled SCell, ordering of HARQ-ACK bits may be defined to be performed according to order of legacy (e.g., Rel-11) subframe indexes matched with the DL HARQ reference configuration of the finally determined SCell.

4-5. Rule #2-2: eIMTA-Enabled PCell and eIMTA-Enabled SCell

For an eIMTA-enabled PCell (Example #2-2-M), regarding PUCCH resource allocation, it may be defined that HARQ-ACK is transmitted according to the DL HARQ reference configuration of a finally determined PCell, and implicit PUCCH resource stacking, block interleaving and $N_{offset}$ signaling are performed according to Table 3.

For the eIMTA-enabled PCell, regarding ordering of HARQ-ACK bits, it may be defined that ordering of HARQ-ACK bits is performed according to order of subframe indexes related to implicit PUCCH resource stacking (namely, Table 3-A and Table 3-B) matched with DL HARQ reference configuration of the PCell described in Table 3.

In addition, for an eIMTA-enabled SCell (Example #2-2-N), regarding PUCCH resource allocation, it may be defined that HARQ-ACK is transmitted according to the finally determined DL HARQ reference configuration of the SCell, and implicit PUCCH resource stacking, block interleaving and $N_{offset}$ signaling which are matched with DL HARQ reference configuration of the SCell are performed according to Table 3.

Further, for the eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

Next, for the eIMTA-enabled SCell (Example #2-2-O), regarding PUCCH resource allocation, it may be defined that HARQ-ACK is transmitted according to the finally determined DL HARQ reference configuration of the SCell, and implicit PUCCH resource stacking, block interleaving and $N_{offset}$ signaling which are matched with DL HARQ reference configuration of the SCell are performed according to Table 3.

Further, ordering of HARQ-ACK bits may be defined to be performed according to order of legacy (e.g., Rel-11) subframe indexes matched with the DL HARQ reference configuration of the finally determined SCell.

4-6. Rule #2-3: Non-eIMTA-Enabled PCell and eIMTA-Enabled SCell

For a non-eIMTA-enabled PCell (Example #2-3-P), regarding PUCCH resource allocation, it may be defined that HARQ-ACK is transmitted according to the DL HARQ reference configuration of a finally determined PCell, and all parameters and operations related to implicit PUCCH resource stacking conform to legacy (e.g., Rel-11) operations. That is, implicit PUCCH resource stacking, block interleaving and $N_{offset}$ signaling described in Table 3 may be defined not to be used.

Further, for the non-eIMTA-enabled PCell, ordering of HARQ-ACK bits may be defined to be performed according to order of legacy (e.g., Rel-11) subframe indexes matched with the DL HARQ reference configuration of the finally determined PCell.

Next, for an eIMTA-enabled SCell (Example #2-3-Q), regarding PUCCH resource allocation, it may be defined that HARQ-ACK is transmitted according to the finally determined DL HARQ reference configuration of the SCell, and all parameters and operations related to implicit PUCCH resource stacking conform to legacy LTE (e.g., Rel-11) operations. That is, implicit PUCCH resource stacking, block interleaving and Noffset signaling described in Table 3 may be defined not to be used.

Further, for the eIMTA-enabled SCell, ordering of HARQ-ACK bits may be defined to be performed according to order of subframe indexes (namely, Table 3-A and Table 3-B) related to implicit PUCCH resource stacking matched with the DL HARQ reference configuration of the SCell described in Table 3.

In addition, for the eIMTA-enabled SCell (Example #2-3-R), regarding PUCCH resource allocation, it may be defined that HARQ-ACK is transmitted according to the finally determined DL HARQ reference configuration of the SCell, and all parameters and operations related to implicit PUCCH resource stacking conform to legacy LTE (e.g., Rel-11) operations. That is, implicit PUCCH resource stacking, block interleaving and $N_{offset}$ signaling described in Table 3 may be defined not to be used.

Further, for the eIMTA-enabled SCell, ordering of HARQ-ACK bits may be defined to be performed according to order of legacy LTE (e.g., Rel-11) subframe indexes matched with the DL HARQ reference configuration of the finally determined SCell.

In addition, for the eIMTA-enabled SCell (Example #2-3-S), regarding PUCCH resource allocation, it may be defined that HARQ-ACK is transmitted according to the finally determined DL HARQ reference configuration of the SCell, and all parameters and operations related to implicit PUCCH resource stacking conform to legacy LTE (e.g., Rel-11) operations. That is, implicit PUCCH resource stacking, block interleaving and $N_{offset}$ signaling described in Table 3 may be defined not to be used.

Further, for the eIMTA-enabled SCell, ordering of HARQ-ACK bits may be defined to be performed according to order of legacy LTE (e.g., Rel-11) subframe indexes matched with the DL HARQ reference configuration of the finally determined SCell.

Specifically, PUCCH resource allocation and ordering of HARQ-ACK bits for the SCell may be performed according to eIMTA-mode configuration for respective cells (or component carriers) and configuration of self/cross carrier scheduling based on a combination of the following rules Self-Scheduling:
for an eIMTA-enabled PCell and a non-eIMTA-enabled SCell: (Example #1-1-C);
for an eIMTA-enabled PCell and an eIMTA-enabled SCell: (Example #1-2-E);
for a non-eIMTA-enabled PCell and an eIMTA-enabled SCell: (Example #1-3-H).

Cross Carrier Scheduling:
for an eIMTA-enabled PCell and a non-eIMTA-enabled SCell: (Example #2-1-L);
for an eIMTA-enabled PCell and an eIMTA-enabled SCell: (Example #2-2-N);
for a non-eIMTA-enabled PCell and an eIMTA-enabled SCell: (Example #2-3-S).

The embodiments of the present invention described above may be set to be applied only in at least one of i) a case where usage of a radio resource of at least one specific cell dynamically changes according to the state of load, ii) a case where a transmission mode (TM) of at least one specific cell is designated as a predefined TM, and iii) a case where a UL-DL configuration of at least one specific cell (e.g., TDD eIMTA Cell) is (re)set to a specific value, iv) a case where cross carrier scheduling is configured, and v) a case where self-scheduling is configured.

It is apparent to those skilled in the art that the embodiments/configurations/rules may be considered as independent options since they may also be included in one of the implemented methods of the present invention. The proposed embodiments/configurations/rules/methods described herein may be independently implemented or a combination thereof may be implemented.

Further, a BS may deliver information on the embodiments/configurations/rules/methods described above or information on whether or not the embodiments/configurations/rules/methods are adopted to the UE through a predefined signal (e.g., a physical layer signal or higher layer signal).

Further, the embodiments of the present invention described above may also be applied to a case where cells having different TDD UL-DL configurations (different TDD UL-DL configurations (e.g., SIB1 UL-DL Configuration (P Cell) and RadioResourceConfigCommonSCell IE (SCell)) are subjected to carrier aggregation (CA), and usage of a radio resource for at least one of the cells changes dynamically according to the state of load.

Figure 13:
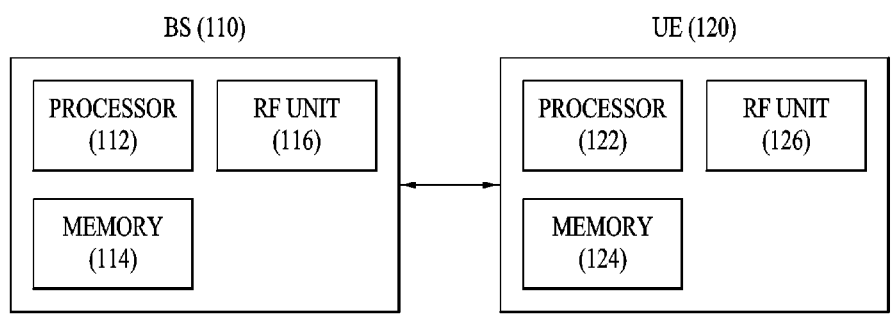
FIG. 13 illustrates a base station and a user equipment which are applicable to an embodiment of the present invention.

FIG. 13 illustrates a BS and UE which are applicable to an embodiment of the present invention.

If a wireless communication system includes a relay, communication on the backhaul link is performed between the BS and the relay, and application on an access link is performed between the relay and the UE. Accordingly, the BS or UE illustrated in the figure may be replaced by a relay according to a situation.

Referring to FIG. 13, a wireless communication system includes a BS 110 and a UE 120. The BS 110 includes a processor 112, a memory 114, and a radio frequency (RF) unit 116. The processor 112 may be configured to implement the procedures and/or methods proposed herein. The memory 114 is connected to the processor 112 and stores various kinds of information related to operation of the processor 112. The RF unit 116 is connected to the processor 112 and transmits and/or receives a radio signal. The UE 120 includes a processor 122, a memory 124, and an RF unit 126. The processor 122 may be configured to implement procedures and/or methods proposed herein. The memory 124 is connected to the processor 122 and stores various kinds of information related to operation of the processor 122. They RF unit 126 is connected to the processor 122 and transmits and/or receives a radio signal. The BS 110 and/or the UE 120 may have a single antenna or multiple antennas.

The embodiments described above are constructed by combining elements and features of the present invention in a predetermined form. The elements or features should be considered selective unless explicitly mentioned otherwise. Each of the elements or features can be implemented without being combined with other elements. In addition, some elements and/or features may be combined to configure an embodiment of the present invention. The ordering of the operations discussed in the embodiments of the present invention may be changed. Some elements or features of one embodiment may also be included in another embodiment, or may be replaced by corresponding elements or features of another embodiment. It is apparent that claims that are not explicitly cited in each other in the appended claims may be presented in combination as an embodiment of the present invention or included as a new claim by subsequent amendment after the application is filed.

In this specification, a specific operation described as being performed by a BS may be performed by an upper node in some cases. That is, it is apparent that various operations performed for communication with a UE in a network constituted by a plurality of network nodes including a BS may be performed by the BS or other network nodes. The term "BS" may be replaced with the terms "fixed station", "Node B", "eNode B (eNB)", "Access Point (AP)", etc.

The embodiments of the present invention may be implemented through various means, for example, hardware, firmware, software, or a combination thereof. When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, or the like.

When implemented by firmware or software, an embodiment of the present invention may be embodied as a module, a procedure, or a function that performs the functions or operations described above. Software code may be stored in a memory unit and executed by a processor.

The memory unit is located at the interior or exterior of the processor and may transmit and receive data to and from the processor via various known means.

The present invention may be carried out in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for transmitting an uplink control channel in a wireless communication system supporting reconfiguration of a radio resource and an apparatus therefor have been described above focusing on exemplary application thereof to a 3GPP LTE system. However, the method and apparatus may also be applied to various wireless communication systems other than the 3GPP LTE system.

The invention claimed is:

1. A method for transmitting an uplink control channel of a user equipment (UE) connected with Primary Cell (PCell) and Secondary Cell (SCell) in a wireless communication system, the method comprising:
receiving, from the PCell, 1 bit information for determining an offset value from a first Physical Uplink Control Channel (PUCCH) resource region for a first type subframe to a second PUCCH resource region for a second type subframe and a third type subframe; and
transmitting, to the PCell, an Acknowledgement/Negative-Acknowledgement (ACK/NACK) related to the SCell for at least one downlink subframe in the second PUCCH resource region determined based on the 1 bit information,
wherein the SCell supports a reconfiguration of a radio resource,
wherein the second PUCCH resource region is determined based on the offset value obtained via Radio Resource Control (RRC) signaling when the 1 bit information includes a first value,
wherein the second PUCCH resource region is determined based on the offset value obtained based on a total sum of control channel elements (CCEs) for downlink and special subframes when the 1 bit information includes a second value,
wherein the first type subframe has same Hybrid Automatic Repeat Request (HARQ) timing for an enhanced interference management and traffic adaptation (eIMTA) UE and a non-eIMTA UE and has a fixed configuration of the radio resource,
wherein the second type subframe has different HARQ timing for the eIMTA UE and the non-eIMTA UE and has the fixed configuration of the radio resource,
wherein the third type subframe has a changeable configuration of the radio resource, and
wherein bits of the ACK/NACK are ordered based on whether the PCell supports the reconfiguration of the radio resource.

2. The method of claim 1, wherein the bits of the ACK/NACK are ordered based on <Table A> when the PCell supports the reconfiguration of the radio resource,

TABLE A

| DL HARQ reference configuration | ULDL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | Invalid | | | | | | |
| | 4 | | | | Invalid | | | | | | |
| | 5 | | | | Invalid | | | | | | |
| | 6 | — | — | 7 | — | — | — | — | 7 | — | — |
| 4 | 0 | — | — | — (or (6)) | — | — | — | — | — | — | — |
| | 1 | — | — | 7, (6) | 4 | — | — | — | — | — | — |
| | 2 | | | | Invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | Invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |
| | 5 | — | — | 13, 12, 9, 8, 7, 5, 4, 11, 6 | — | — | — | — | — | — | — |
| | 6 | — | — | 7 | — | — | — | — | — | — | —. |

3. The method of claim 1, wherein the bits of the ACK/NACK are ordered based on <Table B> when the PCell supports the reconfiguration of the radio resource,

TABLE B

| DL HARQ reference configuration | ULDL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | Invalid | | | | | | |
| | 4 | | | | Invalid | | | | | | |
| | 5 | | | | Invalid | | | | | | |
| | 6 | — | — | 6, 8, 4 | — | — | — | — | 8, 6, 4 | — | — |
| 4 | 0 | — | — | 12, 7, 11, 8 | 7, 4, 5, 6 | — | — | — | — | — | — |
| | 1 | — | — | 12, 8, 11 | 7, 5, 6 | — | — | — | — | — | — |
| | 2 | | | | Invalid | | | | | | |
| | 3 | — | — | 12, 8 | 4, 7 | — | — | — | — | — | — |
| | 4 | — | — | — | — | — | — | — | — | — | — |
| | 5 | | | | Invalid | | | | | | |
| | 6 | — | — | 12, 11, 8 | 4, 5, 6 (or, 4, 6, 5) | — | — | — | — | — | — |

TABLE B-continued

| DL HARQ reference configuration | ULDL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4 9, 5 | — | — | — | — | — | — | —. |

4. A user equipment (UE) connected with Primary Cell (PCell) and Secondary Cell (SCell) for transmitting an uplink control channel in a wireless communication system, the UE comprising:
a transceiver; and
a processor,
wherein the processor is configured to:
control the transceiver to receive, from the PCell, 1 bit information for determining an offset value from a first Physical Uplink Control Channel (PUCCH) resource region for a first type subframe to a second PUCCH resource region for a second type subframe and a third type subframe, and
control the transceiver to transmit, to the PCell, an Acknowledgement/Negative-Acknowledgement (ACK/NACK) related to the SCell for at least one downlink subframe in the second PUCCH resource region determined based on the 1 bit information,
wherein the SCell supports a reconfiguration of a radio resource,
wherein the second PUCCH resource region is determined based on the offset value obtained via Radio Resource Control (RRC) signaling when the 1 bit information includes a first value,
wherein the second PUCCH resource region is determined based on the offset value obtained based on a total sum of control channel elements (CCEs) for downlink and special subframes when the 1 bit information includes a second value,
wherein the first type subframe has same Hybrid Automatic Repeat Request (HARQ) timing for an enhanced interference management and traffic adaptation (eIMTA) UE and a non-eIMTA UE and has a fixed configuration of the radio resource,
wherein the second type subframe has different HARQ timing for the eIMTA UE and the non-eIMTA UE and has the fixed configuration of the radio resource,
wherein the third type subframe has a changeable configuration of the radio resource, and
wherein bits of the ACK/NACK are ordered based on whether the PCell supports the reconfiguration of the radio resource.

5. The UE of claim 4, wherein the bits of the ACK/NACK are ordered based on <Table A> when the PCell supports the reconfiguration of the radio resource,

TABLE A

| DL HARQ reference configuration | ULDL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 6 | — | — | — | — | 6 | — | — |
| | 1 | — | — | 7, 6 | — | — | — | — | 7, 6 | — | — |
| | 2 | — | — | 8, 7, 4, 6 | — | — | — | — | 8, 7, 4, 6 | — | — |
| | 3 | | | | Invalid | | | | | | |
| | 4 | | | | Invalid | | | | | | |
| | 5 | | | | Invalid | | | | | | |
| | 6 | — | — | 7 | — | — | — | — | 7 | — | — |
| 4 | 0 | — | — | — (or (6)) | — | — | — | — | — | — | — |
| | 1 | — | — | 7, (6) | 4 | — | — | — | — | — | — |
| | 2 | | | | Invalid | | | | | | |
| | 3 | — | — | 7, (6), 11 | 6, 5 | — | — | — | — | — | — |
| | 4 | — | — | 12, 8, 7, 11 | 6, 5, 4, 7 | — | — | — | — | — | — |
| | 5 | | | | Invalid | | | | | | |
| | 6 | — | — | 7 | 7 | — | — | — | — | — | — |
| 5 | 0 | — | — | 6 | — | — | — | — | — | — | — |
| | 1 | — | — | 7, 6 | — | — | — | — | — | — | — |
| | 2 | — | — | 8, 7, 4, 6 | — | — | — | — | — | — | — |
| | 3 | — | — | 7, 6, 11 | — | — | — | — | — | — | — |
| | 4 | — | — | 12, 8, 7, 11 | — | — | — | — | — | — | — |
| | 5 | — | — | 13, 12, 9, 8, 7, 5, 4, 11, 6 | — | — | — | — | — | — | — |
| | 6 | — | — | 7 | — | — | — | — | — | — | —. |

6. The UE of claim 4, wherein the bits of the ACK/NACK are ordered based on <Table B> when the PCell supports the reconfiguration of the radio resource,

TABLE B

| DL HARQ reference configuration | ULDL Configuration given by SIB-1 | Subframe n | | | | | | | | | |
|---|---|---|---|---|---|---|---|---|---|---|---|
| | | 0 | 1 | 2 | 3 | 4 | 5 | 6 | 7 | 8 | 9 |
| 2 | 0 | — | — | 7, 8, 4 | — | — | — | — | 7, 8, 4 | — | — |
| | 1 | — | — | 8, 4 | — | — | — | — | 8, 4 | — | — |
| | 2 | — | — | — | — | — | — | — | — | — | — |
| | 3 | | | | Invalid | | | | | | |
| | 4 | | | | Invalid | | | | | | |
| | 5 | | | | Invalid | | | | | | |
| | 6 | — | — | 6, 8, 4 | — | — | — | — | 8, 6, 4 | — | — |
| 4 | 0 | — | — | 12, 7, 11, 8 | 7, 4, 5, 6 | — | — | — | — | — | — |
| | 1 | — | — | 12, 8, 11 | 7, 5, 6 | — | — | — | — | — | — |
| | 2 | | | | Invalid | | | | | | |
| | 3 | — | — | 12, 8 | 4, 7 | — | — | — | — | — | — |
| | 4 | — | — | — | — | — | — | — | — | — | — |
| | 5 | | | | Invalid | | | | | | |
| | 6 | — | — | 12, 11, 8 | 4, 5, 6 (or, 4, 6, 5) | — | — | — | — | — | — |
| 5 | 0 | — | — | 12, 7, 11, 13, 8, 4, 9, 5 | — | — | — | — | — | — | — |
| | 1 | — | — | 13, 12, 8, 11, 4, 9, 5 | — | — | — | — | — | — | — |
| | 2 | — | — | 13, 12, 9, 11, 5 | — | — | — | — | — | — | — |
| | 3 | — | — | 13, 12, 5, 4, 8, 9 | — | — | — | — | — | — | — |
| | 4 | — | — | 13, 5, 4, 6, 9 | — | — | — | — | — | — | — |
| | 5 | — | — | — | — | — | — | — | — | — | — |
| | 6 | — | — | 13, 12, 11, 6, 8, 4, 9, 5 | — | — | — | — | — | — | —. |

* * * * *